Figure 1:
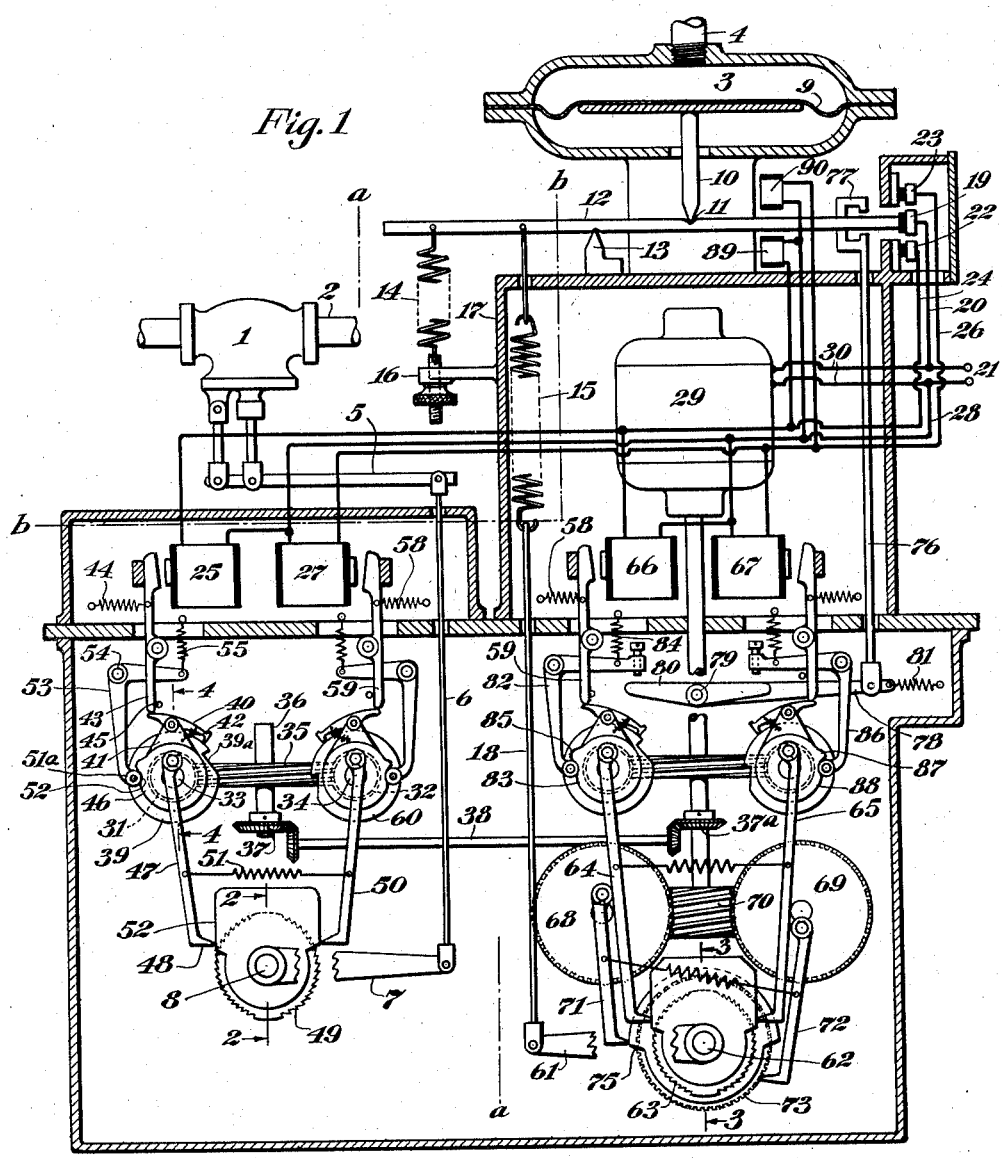

Nov. 25, 1930.  C. H. SMOOT  1,782,832
REGULATOR
Filed March 14, 1929   3 Sheets-Sheet 1

INVENTOR
Charles H. Smoot,
BY
ATTORNEYS

Nov. 25, 1930.  C. H. SMOOT  1,782,832
REGULATOR
Filed March 14, 1929   3 Sheets-Sheet 2
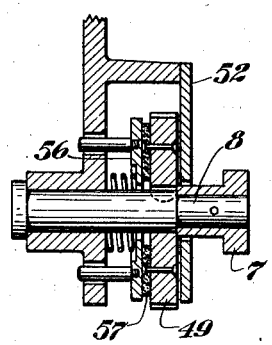
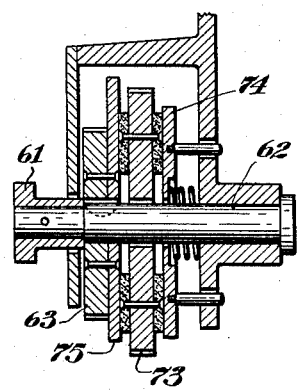
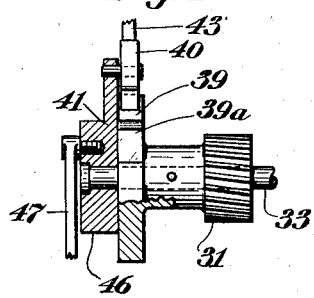
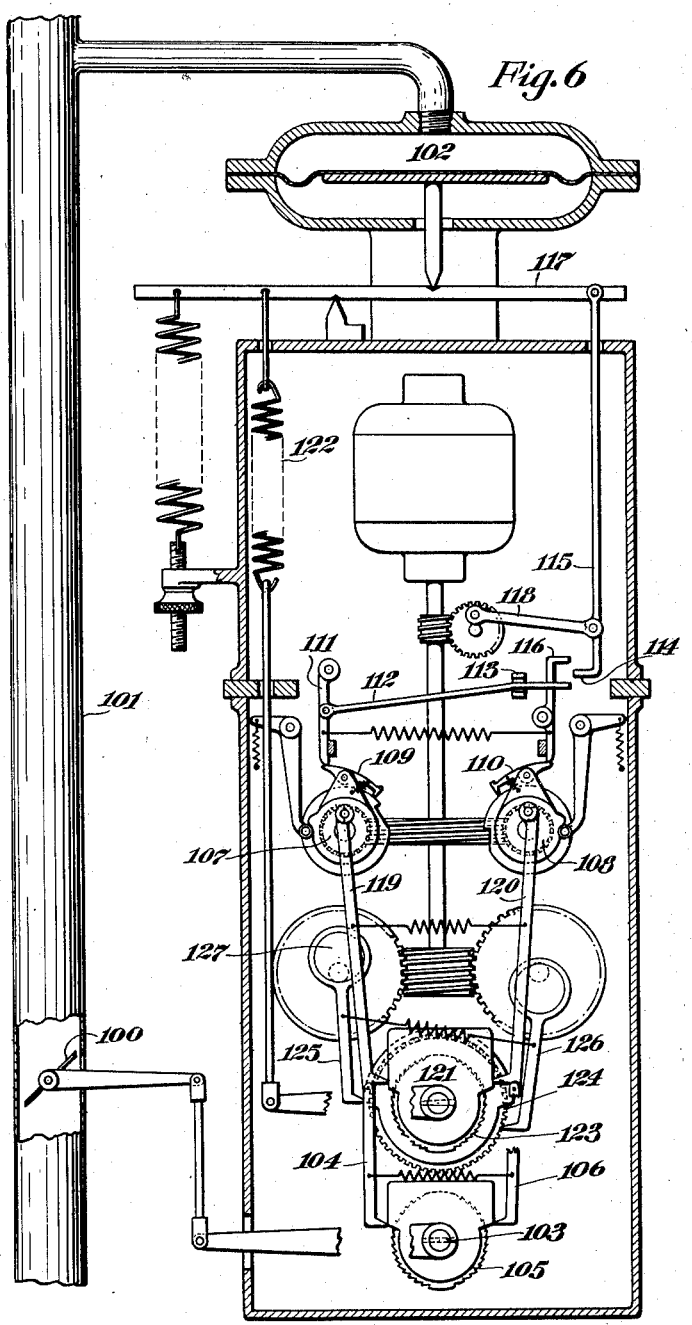
INVENTOR
Charles H. Smoot,
BY
ATTORNEYS

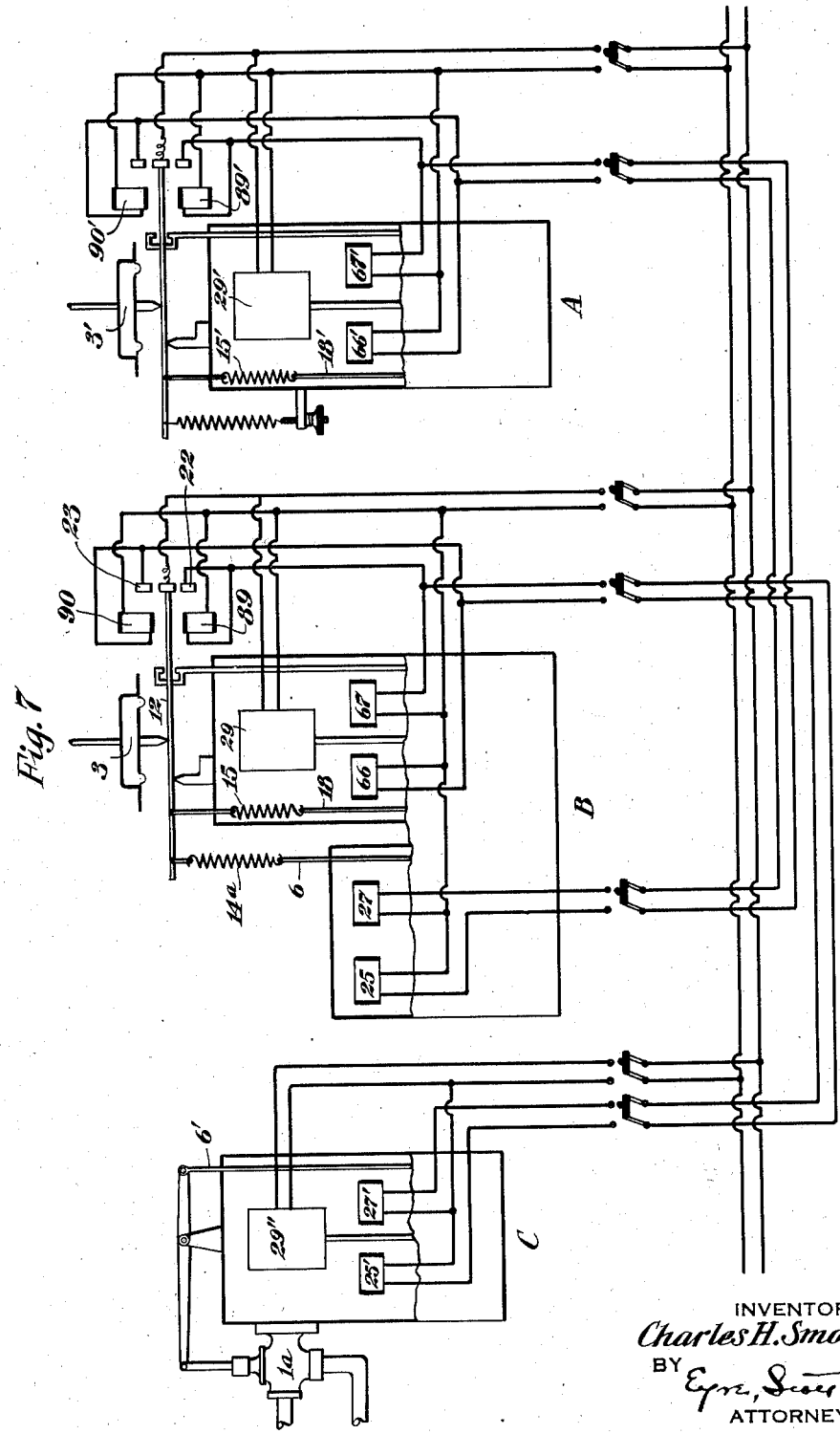

Patented Nov. 25, 1930

1,782,832

UNITED STATES PATENT OFFICE

CHARLES H. SMOOT, OF MAPLEWOOD, NEW JERSEY

REGULATOR

Application filed March 14, 1929. Serial No. 346,917.

My invention relates to the art of regulation and comprises a novel regulator which is rugged, stable and simple of construction. My regulator embodies the essential principles of the regulator disclosed and claimed in my Patent No. 1,658,577, dated Feb. 7, 1928, while improving on the specific regulator of that patent in various respects herein pointed out.

My present invention, like that of the patent, comprises a regulator of the type in which a force varying as a function of the element controlled opposes a regulating force to effect the movement of the controlling means through auxiliary electrical power means and in which means are provided for effectively preventing hunting of the apparatus. In the patented device, at least two reversible electric motors were utilized which, during operation of the regulator, were continually started and stopped. Certain disadvantages result from such continual stopping and starting of motors, and in practice it has been found that various safety devices are advisable therewith to permit over travel, racing, etc., of the motors. My present invention avoids these difficulties by utilizing one continuously operated motor instead of the two or more intermittently operated motors of the patent and results in improved regulation by the use of novel mechanical features.

My present regulator is so constructed as to lend itself to a wide variety of uses, either as a single regulator or in combination with additional regulators of similar or different construction, to accomplish resulting regulation not possible with one regulator alone. When several regulators of this type are used in combination, they may be so arranged as to insure very exact regulations between their actions even when located at great distances apart, and furthermore, such regulators may be linked together in such manner that a control may be effected in correct response to a variation in a function of the element controlled occurring at a remote point, which response may again be modified in response to variations in the function at an even greater distance from the point of control.

For a better understanding of my invention reference should be had to the drawings in which I have illustrated in a somewhat simplified form various embodiments of my improved regulator together with certain modifications suitable for particular uses to which my invention may be applied. In the drawings like numerals refer to like parts.

Fig. 1 illustrates one embodiment of a complete regulating unit constructed according to my invention.

Figure 5:
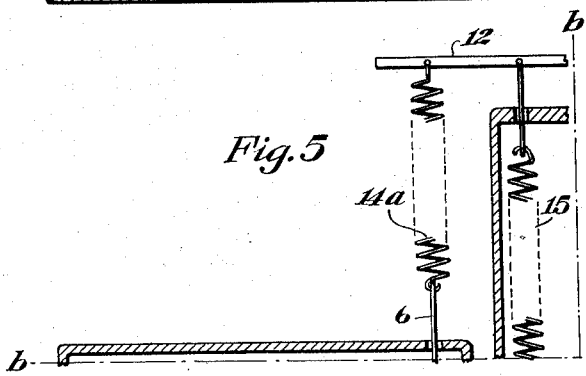

Figs. 2, 3 and 4 are sectional views along the lines 2—2, 3—3 and 4—4, respectively, of Fig. 1. Fig. 5 is a detail illustrating a modification of a part of the apparatus of Fig. 1 indicated by the lines $b$—$b'$ thereon suitable for use when the latter forms one of a plurality of interconnected regulators of a system.

Fig. 6 illustrates another modification of a complete regulating unit constructed according to my invention, and Fig. 7 illustrates diagrammatically one method of interconnecting a plurality of my regulators.

Referring to Figs. 1, 2, 3 and 4, an element to be controlled, in this instance a valve 1, effects the control of the flow of actuating fluid through a pipe 2. For the purposes of explanation, the fluid in pipe 2 may be assumed to be steam for operating a turbo-blower, the outlet pressure of which it is desired to regulate, which pressure may be considered to be that transmitted to a chamber 3 of the regulator by a pipe 4.

In the specific application illustrated the valve is operated to maintain a constant fluid pressure at some point and is adjusted to the position corresponding to the desired pressure by means of suitable links 5 and 6 connected to one end of an arm 7, the other end of which is rigidly mounted on a driven shaft 8. The regulator controls the rotation of the shaft 8 in one direction or the other in response to variations in the desired pressure as measured in the chamber 3, the pressure in the chamber 3 exerting a downward push upon a diaphragm 9 forming the lower wall of the chamber. The underside of the diaphragm 9 is exposed to the atmosphere which in this instance corresponds to one of the controlling forces and is a constant. The diaphragm 9 is rigidly attached to a rod 10, the lower end of which is formed as a knife edge and rests in a groove 11 on a movable lever 12. Variations in pressure in chamber 3 are thus transmitted to the lever 12 tending to move the latter about its pivot 13. Opposing the movement of the lever by rod 10 are springs 14 and 15, one end of each of which is attached to the lever at the opposite side of the pivot 13 from rod 10. The lower end of spring 14 is attached to a fixed support 16 projecting from a casing 17 within which is contained the regulator proper. Preferably the tension of spring 14 comprising another controlling force may be manually adjusted as shown. The lower end of spring 15 is attached to a vertically movable rod 18 to vary the tension of the spring as hereinafter described.

The lever 12 carries at one end an electrical contact 19 which is connected through a flexible conductor 20 with one side of a suitable source of electromotive force indicated at 21. Arranged on either side of contact 19 are fixed contacts 22 and 23, the former of which is connected through a conductor 24 with one terminal of an electromagnet 25 and the latter of which is connected through a conductor 26 with one terminal of a similar electromagnet 27. The other terminals of both electromagnets are connected through a common conductor 28 with the other side of the source of electromotive force 21. The arrangement of contact 19 with contacts 22 and 23 is such that a slight movement of lever 12 will cause energization of one or the other of electromagnets 25 and 27.

Within the casing 19 is mounted an electric motor 29 connected through leads 30 with the source of electromotive force 21. A pair of gear wheels 31 and 32 are mounted respectively on shafts 33 and 34 suitably journaled within the casing 17. These gears 31 and 32 mesh with a worm gear 35 mounted on a shaft 36 continuously rotated by motor 29 by means of any suitable gearing to the shaft thereof. In the modification illustrated the gearing comprises bevel gears 37 and 37ª and auxiliary shaft 38. The shaft 33 has rigidly mounted thereupon a disk 39 provided with a recess 39ª along one part of its periphery adapted to coact with a hooked portion of a latch device 40. The latch device 40 is pivoted on a support 41 rotatably mounted on the shaft 33. A spring 42 attached at one end to the latch 40 and at the other end to the member 41 tends to hold the hooked portion of the latch in engagement with the recess 39ª thereby causing the member 41 to rotate with the gear 31. A trip 43 adapted to disengage the latch 40 and to thereby stop the rotation of member 41, comprises a pivoted arm forming at one end an armature for electromagnet 25. A spring 44 attached at one end to a fixed support and at the other end to the trip 42 tends to hold the same against a stop 45 in a position to coact with the latch 40 and to tip the same about its pivot against the tension of spring 42, thus to prevent the rotation of member 41. Upon energization of electromagnet 25, however, its armature is attracted and trip arm 43 is moved against the tension of spring 44 and out of engagement with the latch 40.

Eccentrically and pivotally mounted on a member 46, integral with member 41, is a pawl 47, which carries a pallet 48 adapted to coact with a toothed ratchet wheel 49 rigidly mounted on shaft 8 to turn the wheel through a definite arc in a counter clockwise direction for each revolution of members 46 and 41.

The energization of electromagnet 25 thus causes a counter clockwise rotation of shaft 8 and such rotation of shaft 8, through arm 7 and links 5 and 6, tends to close valve 1.

Means similar to those above described are associated with electromagnet 27 to cause the opening of valve 1 upon energization of the electromagnet. It is not thought necessary to describe these means, as they are similar to those already described with reference to the turning of shaft 8 in a counter clockwise direction.

The pawl 50, corresponding to pawl 47, operates when reciprocated to turn wheel 49 in a clockwise direction, the teeth of wheel 49 on opposite halves of its periphery being oppositely disposed as shown for permitting pawls 47 and 50 to drive it in opposite directions. Positive action of pawls 47 and 50 is insured by the provision of a tension spring 51 which is connected at either end to one of the pawls and tends to keep their respective pallets against the teeth of wheel 49. A stationary shield 52 covering a portion of the teeth of wheel 49, and upon which the pallets ride when at their extreme vertical position, serves to maintain the pawls when in this position out of engagement with wheel 49, so as to permit the turning of shaft 8 by whichever pawl is being reciprocated due to the energization of its associated magnet.

To prevent the possibility of over travel of members 41 and 46 after deenergization of magnet 25 with the danger of latch 40 being out of position to be engaged by member 43 and also with the danger of pawl 47 being at such a lowered position as to engage wheel 49 and to thus prevent the turning thereof by pawl 50, a friction roller 51ª is provided to bear against the surface of member 46 and to enter a recess 52 therein when the desired position of rest is reached. The roller 51 is carried by one arm of a bell crank lever 53, pivoted at 54, the other arm of which is biased by a spring 55 in such direction as to yieldably hold roller 51 in contact with the surface of member 46.

As shown in Fig. 2, frictional means, comprising a spring pressed disk 56 bearing upon a surface 57 of frictional material attached to wheel 49 is provided to prevent over travel of shaft 8.

The apparatus so far described operates to maintain a constant pressure in chamber 3 only with hunting. With the pressure within chamber 3 equal to that of the atmosphere or exceeding it by an amount sufficient to counterbalance the tensions of springs 14 and 15, the lever 12 will be in the neutral position with contact 19 intermediate contacts 22 and 23 and electromagnets 25 and 27 will be deenergized. Under these circumstances the spring 44 and the corresponding spring 58 will cause the trip 43 and the corresponding trip 59 to maintain their respective latches out of engagement with the respective recesses in the continuously rotating member 39 and in the corresponding member 60. Pawls 47 and 50 will therefore not be reciprocated and shaft 8 will remain idle, thus maintaining the valve 1 in its then position. Assume now an increase in pressure in chamber 3 above that desired. The increase in pressure causes a tipping of lever 12 in a direction to close contacts 19 and 22 and to thus energize electromagnet 25 with the consequent release by trip 43 of latch 40. The latch 40 is then in a position to engage recess 39ª when the continual rotation of shaft 33 next brings the recess into engaging position. The resulting rotation of member 46 causes a reciprocation of pawl 47 and a consequent turning of shaft 8 in a counter clockwise direction to close valve 1. The closure of the valve results in a reduction of the pressure in chamber 3 and thus reduces the force on lever 12 thereby opening contacts 19 and 22 and deenergizing electromagnet 25 with the consequent stoppage of the reciprocation of pawl 47. There is a time lag, however, between the movement of the valve and the change in the pressure in chamber 3 occasioned thereby. As a result, by the time the pressure in chamber 3 has been returned to the desired value and the lever has been returned to neutral position, the valve has been closed by too great an amount causing the pressure in chamber 3 to finally decrease below the value desired. This causes the apparatus to act in the opposite direction with the energization of magnet 27 and consequent reciprocation of pawl 50 to open the valve. To prevent this hunting of the regulator additional means are provided. These means, as in my prior patent above referred to, comprise means for returning the balance to neutral position prior to the complete return of the pressure to that desired by the addition of a force to the balance which is brought about by apparatus thrown into operation simultaneously with the regulating means and which is gradually removed from the balance by means later brought into operation. As in the patented device the force added to the balance to restore the neutral position and then gradually removed therefrom is a resilient force, and in the modification herein illustrated comprises the spring 15, the tension or compression of which is controlled by the position of rod 18.

Rod 18 is linked to an arm 61 rigidly attached to a shaft 62 suitably journaled in the casing 17. Rigidly mounted on shaft 62 is a wheel 63 which may be similar in all respects to wheel 49 on driven shaft 8, but may, if desired, be of different diameter. Wheel 63 is provided with oppositely disposed teeth on the two halves of its periphery to permit the turning of the wheel in one direction by a pawl 64, and in the opposite direction by a pawl 65. Electromagnets 66 and 67 connected in parallel respectively with magnets 25 and 27 control the reciprocation of pawls 64 and 65 through a mechanism comprising means substantially the same as those by which pawls 47 and 50 are controlled by their respective electromagnets, and, for the sake of brevity, those parts which may be mere duplicates of parts to which reference has already been made will not be described further.

It will be apparent that shafts 8 and 62 will be turned simultaneously in the same direction and through proportionate arcs whenever lever 12 departs sufficiently from the neutral position to bring contact 19 into engagement with either contact 22 or contact 23. When shaft 62 is rotated in a counter clockwise direction, rod 18 is lowered and an increasing downward force is applied to the balance lever 12 upon the left of the pivot 13. As such direction of rotation of shaft 62 is occasioned by an increase in pressure in chamber 3, it will be noted that this additional force upon the lever is in a direction to restore balance thereupon prior to the return of the pressure in chamber 3 to that desired. Conversely a rotation of shaft 62 in the opposite direction causes an additional upward force upon lever 12.

The mechanism for gradually removing this additional force from the balance will now be described. Two relatively large gear wheels 68 and 69 are disposed on either side of a worm 70 on the shaft of motor 29 and are continuously rotated thereby at a speed considerably less than that at which the gear wheels operatively associated with pawl 64 and 65 are driven, as indicated in Fig. 1 by the relative sizes of the gear wheels and worms. Eccentrically and rotatably mounted on gears 68 and 69 respectively are pawls 71 and 72 which thus continuously reciprocate substantially vertically. A ratchet wheel 73 is mounted on shaft 62 with its teeth in a position to be engaged by the pallets of pawls 71 and 72, the former to turn it in a counter clockwise direction, as viewed in Fig. 1, and the latter to turn it in the opposite direction. As shown, pawls 71 and 72 are so disposed with relation to the rotation of gears 68 and 69, as to be simultaneously at opposite ends of their strokes. Ratchet wheel 73 (see Fig. 3) is frictionally mounted between a spring pressed disk 74 and a shield 75 rigidly attached to wheel 63. Shield 75 extends radially beyond wheel 73 for one half of its periphery, and tends when rotated by wheel 63 to prevent engagement of one or the other of pawls 71 or 72 with ratchet wheel 73. The frictional tension exerted upon wheel 73 is such that rotation of wheel 73 by pawl 72 turns shaft 62 only if wheel 63 is not being at the same time positively driven by pawl 64. It will be noted that shield 75 when rotated due to the turning of wheel 63 by pawl 64 prevents engagement of pawl 71 with wheel 73, and, conversely, when rotated in the other direction prevents engagement of pawl 72 with wheel 73. Which ever pawl, 71 or 72, that engages wheel 73 is thus tending to return shaft 62 to its original position and thus to remove the additional force added to the balance by the initial rotation of the shaft by the fast moving mechanism. Due to the frictional manner in which wheel 73 is mounted, these slow acting pawls have no effect in reducing this force, as noted above, until the fast moving pawl has ceased reciprocation due to the return of lever 12 to its mid-position. Once shaft 63 has been returned to its initial position by either pawl 71 or 72, no further substantial rotation thereof will be occasioned by these pawls as they will act alternately upon wheel 73 in opposite directions to turn the wheel back and forth through a very small arc; shield 75 preventing engagement of either pawl for more than half its travel.

I have shown also in Fig. 1 additional means for mechanically returning lever 12 to its neutral position after each reciprocation of the fast moving pawls 64 and 65, which means do not interfere with the immediate subsequent turning of the lever if the balance thereupon has not yet been accomplished. This feature, although not essential to the operation, is of advantage in that it insures that the balance lever will only remain displaced when the forces thereupon are not in balance. Preferably also means are provided to insure that the slightest engagement of contact 19 with either contact 22 or 23 will result in at least one reciprocation of the corresponding fast moving pawls. The means for momentarily returning lever 12 to mid-position comprises a rod 76 provided at its upper ends with fixed open jaws 77 disposed above and below lever 12 and adapted upon longitudinal displacement of rod 76 to mechanically return the lever to its neutral position, thus opening either contacts 19 and 22, or 19 and 23. At its lower end, rod 76 is hinged to an arm 78 which is rigidly mounted on a shaft 79 rotatably mounted within the casing 17. A cross-bar 80 is likewise rigidly mounted on shaft 79 and serves to turn the same when either end is depressed. The turning of shaft 79 reciprocates rod 76 against the tension of a spring 81. Depression of the left end of cross-bar 80 to lift rod 76 is effected by means of a bell crank lever 82 mounted with respect to member 83 similarly to the mounting of bell crank lever 53 with respect to member 46, one arm of the lever carrying a roller yieldably held in engagement with the surface of member 83 by a spring 84 attached to the other arm of the lever. A projecting portion 85, on the surface of member 83 turns the lever 82 about its pivot when the roller rides over the projection, to cause the end of the other arm of the lever to contact with and depress the left end of a cross-bar 80. Passage of the roller from projection 85 causes spring 84 to retract the arm of bell crank lever 82 from bar 80 and permits spring 81 to immediately return rod 76 to its neutral position. Similarly, downward movement of rod 76 is effected by the depression of the right end of cross-bar 80 when one arm of a bell crank lever 86 engages therewith due to the passage over a projection 87 on the surface of member 88 of a roller carried by the other arm of the bell crank lever 86.

To insure that the slightest engagement of contact 19 with either contact 22 or 23 will result in at least one actuation of the fast moving mechanisms, electromagnets 89 and 90 are disposed below and above, respectively, lever 12 in such position as to permit lever 12 to act as an armature for whichever electromagnet is energized. Magnet 89 is connected in parallel with magnets 25 and 66, and magnet 90 is connected in parallel with magnets 27 and 67. When contacts 19 and 22 are closed by the tipping of lever 12, magnet 89 tends to maintain these contacts in engagement until they are separated by the mechanical return of lever 12 by rod 76, which deenergizes magnets 25, 66 and 89. Similarly magnet 90 tends to maintain contacts 19 and 23 closed until separated by the downward movement of rod 76.

The operation of the various mechanical parts of the regulator of Fig. 1 has been indicated during the above description, but, for a clearer understanding of my invention a description of the operation of the complete device will now be given. Assuming, as before that the valve 1 controls the supply of steam to a turbo-blower, the outlet pressure of which it is desired to maintain constant as measured in chamber 3, and assuming initially that the pressure in chamber 3 is constant and at the desired value, then the various parts will be in the position indicated in the drawings with all magnets deenergized; with fast moving pawls 47, 50, 64 and 65 stationary and maintained at their highest point of travel with their pallets out of engagement with the teeth of wheels 49 and 63 respectively; with slow moving pawls 71 and 72 reciprocating and turning shaft 62 back and forth through a very small arc insufficient to appreciably vary the tension of spring 15. Assume now that for some reason the pressure in chamber 3 increases above that desired. Lever 12 will then be turned to close contacts 19 and 22 whereupon magnets 25, 66 and 89 will be energized, the first to cause a revolution of members 41 and 46 and a corresponding reciprocation of pawl 47 to close valve 1; the second to cause a similar reciprocation of pawl 64 to turn wheel 63 in a direction to increase the tension of spring 15 and to turn shield 75 in a direction to permit engagement of pawl 72 with wheel 73 throughout its length of travel; and the last to maintain contacts 19 and 22 in engagement. As member 83 approaches one complete revolution the roller carried by bell crank lever 82 rides out on projection 85 causing the other arm of the lever 82 to depress the left end of cross bar 80 to thereby cause the lifting of rod 76. Lower jaw 77 thus lifts lever 12 breaking the circuit for the formerly energized magnets. No further reciprocation of the fast moving pawls will then occur if the lever 12 is now in balance under the changed forces thereupon, viz: the changed tension of spring 15 and the changed pressure in chamber 3. Assuming that the initial pressure change in chamber 3 was small, and that the lever has been balanced by the above described operation, the pressure in chamber 3 will now gradually fall towards its desired value due to the slight closure of valve 1 occasioned by the turning of shaft 8, and the tension of spring 15 will slowly be returned to its initial value by pawl 72 turning the shaft 62 through the frictional gripping of wheel 73 therewith. Preferably the rate of reciprocation of pawl 72, and the size of wheel 73 with respect to shaft 62 is so chosen with respect to the time lag between a shift in valve 1 and the complete pressure change in chamber 3 occasioned thereby, that lever 12 may be maintained in balance during the above described return of the pressure in chamber 3 to that desired and the return of the tension of spring 15 to its original value. In the case of a large original increase in pressure in chamber 3, one reciprocation of pawls 47 and 64 will not suffice to restore balance upon lever 12 and immediately upon retraction of rod 76 by spring 81, contacts 19 and 22 will again engage, and the above operation will be repeated until the balance is finally restored; each reciprocation of pawl 47 corresponding to a definite degree of closure of valve 1, and each reciprocation of pawl 64 corresponding to a definite increment in the tension of spring 15.

In the case of a diminution of pressure in chamber 3 under that desired, lever 12 is moved to close contacts 19 and 23 with consequent energization of magnets 27, 67 and 90 and resulting opening of valve 1, initial decrease in tension of spring 15 and, after balance has been restored to lever 12, the return of the spring tension and of the pressure to their initial respective values.

If it is desired to change the value at which the pressure in chamber 3 is maintained by the regulator of Fig. 1, this may be achieved by manually adjusting the tension of spring 14, which, in the case of increased tension, causes the lever 12 to move to close contacts 19 and 23 and to thus cause valve 1 to be opened and the pressure in chamber 3 to be maintained at a higher value. Similarly a decrease in the tension of spring 14 will cause the regulator to act to maintain a lower constant pressure in chamber 3. Obviously, automatically varying controlling forces could be substituted for either the manually adjustable force of spring 14 or for the constant force of atmospheric pressure acting upon diaphragm 9 whenever it is desired to maintain other than constant pressure in chamber 3.

In certain fluid delivery systems, where fluids are delivered through a mile or more of piping and where the pressure of the fluid at the delivery end is desired to fluctuate about a definite value, as, for example, in the case of turbines delivering steam to a distant accumulator system the pressure of which must on the average be maintained constant but which must be permitted some variation about the average value, regulators of the type of Fig. 1 may conveniently be arranged as shown in Fig. 7. In this figure a regulator A is located at the delivery end of the system and is responsive to the pressure at this end of the system, which pressure, as suggested above, may be that of an accumulator system. The regulator A may be substantially similar to that part only of the regulator of Fig. 1 shown on the right of the line a—a of Fig. 1, the auxiliary driving rod 38, being, of course, omitted. The regulator B in Fig. 7 is interposed at some intermediate point between the supply and delivery ends of the system and is responsive to the fluid pressure at this intermediate point. Regulator B may be substantially the regulator of Fig. 1 except that the part shown in Fig. 5 is substituted for the corresponding portion above and to the left of the line b—b of Fig. 1. This substitution comprises replacing the manually adjustable spring 14 of Fig. 1 by a spring 14ᵃ the tension of which is automatically adjusted by rod 6, and the connecting of magnets 25 and 27 to the fixed contacts 22' and 23' of regulator A, instead of to the contacts of regulator B. (See Fig. 7.)

Regulator C in Fig. 7 is disposed at the supply end to control a valve 1ª in response to the movement of regulators A and B, and, for this purpose may be any mechanism capable of properly moving the element under control in suitably controlled increments. Preferably regulator C comprises apparatus substantially similar to that part of the regulator of Fig. 1 on the left of line a—a and has its magnets 25' and 27' connected with the fixed contacts 22 and 23 of regulator B.

The regulating system of Fig. 7 is preferably arranged so that regulator A is comparatively slow acting and regulator B is comparatively quick acting, in response to pressure regulation, with the result that a constant pressure measured at regulator B and a pressure varying about a constant value measured at regulator A causes regulator C to make no change in the position of the valve 1ª, assuming that the above pressures are those for which the regulators B and A are respectively adjusted. If now the pressure measured by regulator A maintains over a long period, say fifteen or twenty minutes, depending on the adjustment of the regulator, a higher average pressure than that desired, magnet 66' thereof becomes energized, and magnet 25 of regulator B becomes energized as well, the former to adjust the tension of spring 15' of regulator A to return the balance to neutral, and the latter to decrease the tension of spring 14ª of regulator B, thus decreasing one of the controlling forces upon the balance of regulator B and adjusting it to regulate for a lower standard pressure. The balance upon regulator B will thus become upset and lever 12 thereof will move to close contacts 19 and 22 to energize magnet 66 of regulator B and magnet 25' of regulator C, the former to increase the tension of spring 15 of regulator B and the latter to partially close valve 1ª. The partial closure of valve 1ª in time reduces the pressure measured by regulator B to the lower standard called for by the change in tension of spring 14ª occasioned by the action of regulator A, and later results in reducing the average pressure at regulator A to that desired.

Obviously any number of intermediate regulators B can be interposed between the regulated element and the point at which the desired average pressure is to be maintained.

An embodiment of my invention in a somewhat more compact form of regulating unit is illustrated in Fig. 6. In this modification, mechanical, instead of electromagnetic, tripping means are utilized for causing actuation of the fast and slow moving mechanisms, and the same fast moving mechanism operates both the means for controlling the element and also the means for applying the additional force to the balance. The regulator of Fig. 6 is illustrated as controlling by means of a pivoted damper 100 the flow of fluid through a conduit 101 to maintain constant the fluid pressure at a point along the path of flow; the pressure being measured in a chamber 102. Damper 100 is connected by means of suitable linkages to a shaft 103 whereby rotation of the shaft in one direction causes an opening movement of the damper, and a rotation in the opposite direction tends to close the damper. Shaft 103, which corresponds with shaft 8 of Fig. 1, is similarly driven in one direction by a fast moving pawl 104 engaging a ratchet wheel 105 carried by the shaft, or in the other direction by a fast moving pawl 106 engaging the ratchet wheel, and the movement of the pawls 104 and 106 occurs upon unbalance of the regulator due to a variation of the pressure under control. At 107 and 108 is indicated the driving mechanism for pawls 104 and 106, and this mechanism may comprise means substantially the same as the driving means for either pawls 47 and 50 or pawls 64 and 65 of Fig. 1. A latch 109, corresponding to latch 40 of Fig. 1 is associated with the counter clockwise driving means 107 and is tripped by a member 111 which in this instance is adapted to be mechanically disengaged from the latch. Member 111 has linked thereto an arm 112, the remote portion of which is horizontal, and is adapted to slide in fixed bearings 113. The extreme end of the horizontal portion of arm 112 engages a projection 114 on a horizontally and vertically movable member 115 and is moved thereby to release latch 109 whenever the balance lever of the regulator is tipped in a clockwise direction. Associated with the latch 110 of the clockwise fast moving driving means 108 is the tripping member 116, the upper end of which is adapted to engage projection 114 to disengage the latch whenever the balance lever tips in a counter clockwise direction. Member 115 is linked at its upper end to the balance lever 117 and is reciprocated horizontally by means of an eccentric 118 linked to member 115 and suitably driven from the driving motor of the regulator. The arrangement is such that after each horizontal reciprocation of projection 114, if the lever 117 is in its neutral position, no engagement of either trip occurs, but if the balance beam is out of its neutral position, one or the other of trips 111 or 116 will be displaced, causing a release of the associated latch and one rotation of the associated driving means with a consequent reciprocation of either pawl 104 or 106 and the turning of shaft 103 to either close or open damper 100. Pawl 104 at its upper end is linked to a second pawl 119, and the latter is linked to the fast moving driving means 107. Similarly, pawl 106 is linked at its upper end to pawl 120 reciprocated directly by the fast moving means 108. At 121 is indicated means for varying the tension of a spring 122 attached to the lever 117, which means are substantially the same as those shown in cross section in Fig. 3 and correspond with the means for varying the tension of spring 15 in Fig. 1. Ratchet wheel 123 corresponding to wheel 63 of Figs. 1 and 3 is driven by pawls 119 and 120, and the ratchet wheel 124 corresponding to wheel 73 of Figs. 1 and 3 is adapted to be driven by slow moving pawls 125 and 126. These slow moving pawls, which function identically with the slow moving pawls of Fig. 1, reciprocate due to the continual rotation of large gears driven from the motor of the regulator. The particular means for causing the reciprocation of these slow moving pawls is shown in a somewhat different form. These means comprise an eccentric hub 127 mounted on each of the large gears, the hub carrying, but not rigidly connected to an annular extension of the corresponding pawl which thus reciprocates substantially vertically for each rotation of the hub and gear. This arrangement wherein the shaft portion of the pawl does not traverse during its reciprocation the central portion of the gear is preferred when an extended shaft through the gear and hub is contemplated. Obviously the fast moving pawls of Figs. 1 and 6 might be similarly mounted.

The operation of the regulator of Fig. 6 is substantially the same as that described in connection with the regulator of Fig. 1, except in so far as the actual tripping is concerned. Assuming the pressure in chamber 102 is that desired, lever 117 will be in its neutral position and crank 118 will reciprocate member 115 in a horizontal direction. Projection 114 will engage neither arm 112 nor trip 116, and no actuation of the fast moving mechanism will result. Slow moving pawls 125 and 126 will reciprocate, each effecting a slight turning of the ratchet wheel 124, which, however, will have no substantial effect in varying the tension of spring 122. If now the pressure in chamber 102 increases above that desired, lever 117 will be moved in a clockwise direction and projection 114 when moved to the left will engage the end of arm 112 to force trip 111 away from its stop, thereby releasing latch 109. The release of latch 109 will then cause a reciprocation of pawls 119 and 104, the former to cause an increase in tension of spring 122 in a direction to restore the balance of 117, and the latter to partially close the damper 100. If after one complete reciprocation of the fast moving pawls 104 and 119, the lever 117 is returned to balanced condition, trip 111 will engage latch 109 and prevent further reciprocation of the pawls. If, however, the pressure in chamber 102 is still too high and if the tension of spring 122 has not been varied sufficiently to balance this increase of pressure, projection 114 will again cause the trip 111 to be moved to the left and another reciprocation of the fast moving pawls will result. When balance has been finally established upon lever 117, slow moving pawl 126 will gradually return the tension of spring 122 to its initial value, during which time the pressure in chamber 102 will gradually fall, due to the shift in damper 100 towards the closed position.

Conversely, a decrease in pressure in chamber 102 below that desired results in a release by trip 116 of its associated latch and consequent reciprocation of pawls 120 and 106 to decrease the tension of spring 122 and to open damper 100, and, after balance has been restored upon the lever, slow moving pawl 125 will return the tension of spring 122 to its original value.

I have now described two modifications of regulating units constructed according to my invention and indicated one method by which several such units could be advantageously combined into an elastic regulating system capable of a wide variety of uses. In each modification of my invention a balancing device responsive to a force which is a function of the element controlled and to controlling forces operates upon an unbalance of these forces both to adjust the element under control and to temporarily restore a balance of the forces upon the device, as in my earlier patent referred to above. Likewise, as in my prior patent, in each modification the temporary restoration of balance is accomplished by the relatively rapid addition of a force to the balancing device in a direction to restore balance, and the further relatively slow removal thereof after the balance has been returned to neutral position. According to my present invention, however, continuously operating power means are brought by novel electromagnetic or mechanical means into operative relation with parts adapted to perform the described operations.

For convenience I have in each case illustrated my regulator as being in control of, and responsive to, a fluid pressure, and in each case have shown and described the additional force added to the balance as being a resilient force. My invention is not concerned, however, with the particular element controlled nor with any specific type of forces which may be maintained in balance by the regulator. In a copending application of mine, Serial No. 299,246, filed August 13, 1928, I have illustrated a regulator of the type of my Patent No. 1,658,577, applied to the control of temperature. In the said pending application the regulator acts in response to an unbalance of electrical forces to control heat input on the one hand and to temporarily add an electrical force to the balance on the other hand. Obviously the regulator of my present invention can be similarly arranged to control an element in response to an unbalance of electrical forces, and such use is one contemplated by me and is within the scope of my invention.

My invention is not limited to the precise arrangement of mechanical parts nor to the particular construction of the various mechanical elements, as many changes could be made in the apparatus illustrated without departing from the spirit of my invention.

I claim:

1. In a regulating apparatus of the type wherein regulating forces and a force varying as a function of the element controlled act upon a balance which, upon departure from neutral, effects the control of the element through auxiliary electrical power means, the combination comprising a continuously driven electric motor, two mechanisms driven thereby at relatively fast and slow speeds respectively, a shaft adapted when rotated to apply an additional force to the balance, means brought into operation upon a departure of said balance from neutral for driving said shaft by said fast speed mechanism in such direction as to cause said additional force to tend to return said balance to neutral, and means operative after said balance has returned to neutral position for driving said shaft by said slow speed mechanism in a direction to remove said additional force.

2. The combination according to claim 1 wherein said shaft carries a ratchet wheel provided with teeth along its periphery, and wherein the means brought into operation upon a departure of the balance from neutral includes a pair of driving pawls for said teeth adapted to be reciprocated by said motor, tripping means normally preventing reciprocation of said pawls, and means cooperating with said balance adapted to release the tripping means for one of said pawls when said balance departs in one direction from neutral and to release the tripping means for the other of said pawls when said balance departs from neutral in the other direction.

3. In a regulating apparatus of the type wherein regulating forces and a force varying as a function of the element controlled act upon a balance, which, upon departure from neutral, effects the control of the element through auxiliary electrical power means, the combination comprising a continuously driven electric motor, two mechanisms driven thereby at relatively fast and slow speeds respectively, a third member adapted when moved to apply an additional force to the balance, means brought into operation upon a departure of said balance from neutral for moving said third member by said fast speed mechanism in such direction as to cause said additional force to tend to return said balance to neutral, and means operative after said balance has returned to neutral position for moving said third member by said slow speed mechanism in a direction to remove said additional force.

4. The combination according to claim 1 including electro-magnetic means actuated when said balance departs from the neutral position, and adapted to bring into operation said means for driving said shaft by the fast speed mechanism.

5. In a regulating apparatus, a balance, means for subjecting said balance to a controlling force and to a force varying as a function of the element controlled, means brought into operation by a departure of said balance from the neutral position for periodically returning said balance to neutral independently of said forces, and means for controlling said element by said balance.

6. The combination according to claim 1 wherein said shaft has frictionally mounted thereon a ratchet wheel provided with teeth along its entire periphery, and wherein said relatively slow driving mechanism for said shaft comprise a pair of pawls continuously reciprocated by said motor adapted when in engagement with the teeth of said wheel to turn the same in opposite directions, and a shield carried by said shaft adapted to prevent one or the other of said pawls from engaging the teeth of said wheel.

7. In a regulating system adapted to control the position of an element, a regulating device including a balancing member acted upon by controlling forces and by a force varying as a function of the position of said element, a second regulating device including a balancing member acted upon by controlling forces and by a force varying as a function of the position of said element but delayed with respect thereto, means controlled by said last mentioned device in response to an unbalance of the balancing member thereof for causing a related variation in one of the controlling forces acting upon the balancing member of the first mentioned device, and means for positioning said element upon an unbalance of the balancing member of said first mentioned device.

In testimony whereof, I have signed my name to this specification.

CHARLES H. SMOOT.